United States Patent
Schultz

(10) Patent No.: US 9,631,691 B2
(45) Date of Patent: Apr. 25, 2017

(54) VIBRATION DAMPENING DEVICES AND METHODS

(71) Applicant: Magnetic Innovations LLC, McKinney, TX (US)

(72) Inventor: Ricky David Schultz, McKinney, TX (US)

(73) Assignee: MAGNETIC INNOVATIONS LLC, McKinney, TX (US)

(*) Notice: Subject to any disclaimer, the term of this patent is extended or adjusted under 35 U.S.C. 154(b) by 44 days.

(21) Appl. No.: 14/504,239

(22) Filed: Oct. 1, 2014

(65) Prior Publication Data

US 2016/0097435 A1 Apr. 7, 2016

(51) Int. Cl.
| | |
|---|---|
| F16F 15/00 | (2006.01) |
| F16F 7/00 | (2006.01) |
| H01B 7/00 | (2006.01) |
| H01B 11/12 | (2006.01) |
| F16F 15/03 | (2006.01) |
| F16M 1/00 | (2006.01) |

(52) U.S. Cl.
CPC ............ *F16F 7/00* (2013.01); *F16F 15/03* (2013.01); *H01B 7/0009* (2013.01); *H01B 11/12* (2013.01); *F16F 2226/04* (2013.01); *Y10T 29/49117* (2015.01)

(58) Field of Classification Search
CPC ........ F16F 7/00; F16F 9/48; F16F 9/53; F16F 15/03; F16F 2226/04; H01B 7/0009; H01B 11/12; Y10T 29/49117
See application file for complete search history.

(56) References Cited

U.S. PATENT DOCUMENTS

| | | | |
|---|---|---|---|
| 3,240,295 A * | 3/1966 | Martinek | F16F 9/532 188/267 |
| 3,521,216 A | 7/1970 | Tolegian et al. | |
| 3,750,083 A | 7/1973 | Fayling | |
| 3,808,577 A | 4/1974 | Mathauser | |
| 3,845,573 A | 11/1974 | Kasamatsu | |
| 4,696,832 A | 9/1987 | Wright | |
| 4,844,582 A | 7/1989 | Giannini | |
| 4,983,804 A | 1/1991 | Chan et al. | |
| 5,011,434 A | 4/1991 | Blunt | |
| 5,401,175 A | 3/1995 | Guimond et al. | |
| 5,413,503 A | 5/1995 | Salz | |
| 5,466,929 A | 11/1995 | Sakai et al. | |
| 5,650,908 A | 7/1997 | Stanton | |
| 5,740,862 A * | 4/1998 | Sable | E21B 17/1071 166/241.2 |

(Continued)

OTHER PUBLICATIONS

TW-201337124-A Publication: Sep. 2013 English abstract and drawings.*

(Continued)

*Primary Examiner* — Melody Burch
(74) *Attorney, Agent, or Firm* — Slater Matsil, LLP

(57) ABSTRACT

An embodiment vibration dampening device includes a stack of permanent magnets having a plurality of cross-sectional areas, wherein the permanent magnets are electrically coupled in series with each other. The device further includes an insulating sheath disposed around the stack of permanent magnets, and a visco-elastic polymer disposed within the sheath and around the stack of permanent magnets.

23 Claims, 7 Drawing Sheets

(56) References Cited

U.S. PATENT DOCUMENTS

| | | | |
|---|---|---|---|
| 5,921,783 A | 7/1999 | Fritsch et al. | |
| 6,109,971 A | 8/2000 | Vadlakonda | |
| 6,315,696 B1* | 11/2001 | Garrioch | A61H 23/04 |
| | | | 482/44 |
| 6,443,770 B1 | 9/2002 | Lin | |
| 6,492,892 B1 | 12/2002 | Brennan et al. | |
| 6,565,363 B2 | 5/2003 | Downing | |
| 6,721,641 B1* | 4/2004 | Denne | B60G 17/0157 |
| | | | 280/5.515 |
| 6,966,781 B1 | 11/2005 | Bullinger et al. | |
| 7,142,075 B1* | 11/2006 | Roesler | H02K 35/02 |
| | | | 200/181 |
| 7,204,695 B1 | 4/2007 | Shiu et al. | |
| 7,264,479 B1 | 9/2007 | Lee | |
| 7,348,785 B2 | 3/2008 | Maxwell | |
| 7,351,066 B2 | 4/2008 | DiFonzo et al. | |
| 7,402,045 B2 | 7/2008 | Schwartzbart et al. | |
| 7,467,948 B2 | 12/2008 | Lindberg et al. | |
| 7,722,358 B2 | 5/2010 | Chatterjee et al. | |
| 7,771,202 B2 | 8/2010 | Amotz et al. | |
| 7,775,801 B2 | 8/2010 | Shiff et al. | |
| 8,272,876 B2 | 9/2012 | Schultz | |
| 8,362,358 B2 | 1/2013 | Hotte et al. | |
| 8,403,680 B2 | 3/2013 | Schultz | |
| 2001/0050605 A1 | 12/2001 | Sugiura et al. | |
| 2009/0050425 A1* | 2/2009 | Murakami | F16F 9/535 |
| | | | 188/267.2 |
| 2010/0159741 A1 | 6/2010 | Rothbaum | |
| 2010/0193243 A1 | 8/2010 | Hotte et al. | |
| 2011/0056787 A1* | 3/2011 | Luo | F16F 15/18 |
| | | | 188/380 |
| 2011/0070747 A1 | 3/2011 | Ball | |
| 2011/0244697 A1 | 10/2011 | Melby et al. | |
| 2012/0021618 A1 | 1/2012 | Schultz | |
| 2012/0277766 A1* | 11/2012 | Ferree | A61F 2/442 |
| | | | 606/144 |
| 2012/0312578 A1 | 12/2012 | Park et al. | |
| 2015/0000952 A1* | 1/2015 | Schultz | H01F 1/14 |
| | | | 174/78 |

OTHER PUBLICATIONS

"EM I Control Applications Notes for Typical Computer Subsystems: Video Controllers & Cables," Technical Information, 1999, pp. 1-7.

"Hydrogen Tap (Electrictiy Through Magnetic Field) 100," http://www.youtube.com/watch?v=ltnlviCqu70, May 29, 2007, page.

"Hydrogen Tap (Zero Field using 9v AC 800 ma) 101," http://www.youtube.com/watch?v=mV70KQCH31o&NR=1, May 30, 2007, 1 page.

"Ricky David Shultz Statement re Cable with Magnet," disclosed prior to 2010, 6 pages.

"Spark in spiral magnetic field," http://www.youtube.com/watch?v=FrGtPKBXkVQ, Sep. 10, 2007, 1 page.

"Vibration Dampening Device," on display at the Rocky Mountain Audio Fest trade show, Oct. 11-13, 2013, 3 pages.

Hull, "Raman 2013: High Water Sound opens the Heavens," posted on Oct. 14, 2013, http://parttimeaudiophile.com/2013/10/14rmaf-2013-high-water-sound-opens-th-heavens/, 26 pages.

\* cited by examiner

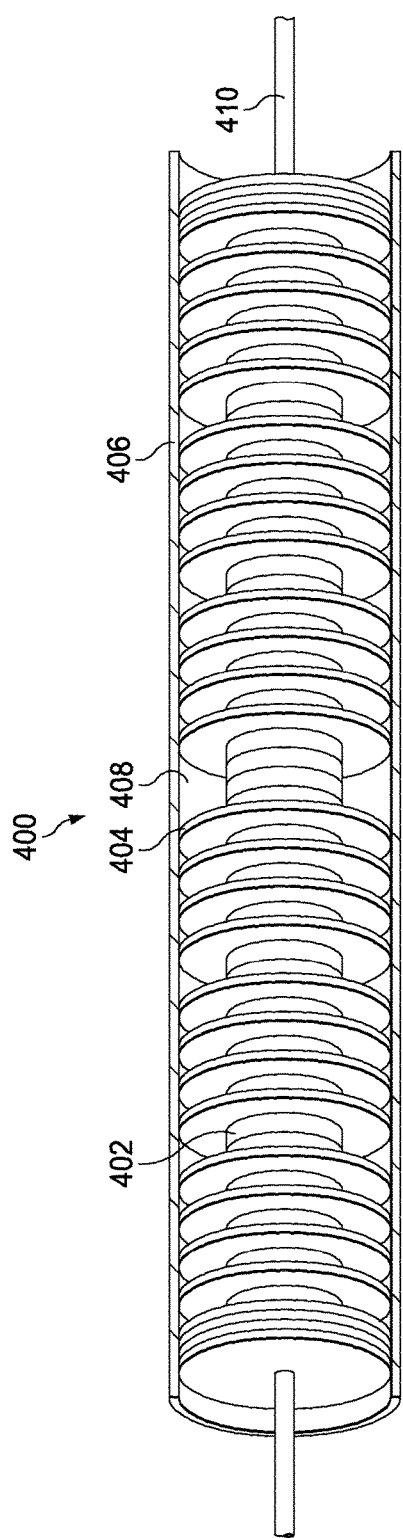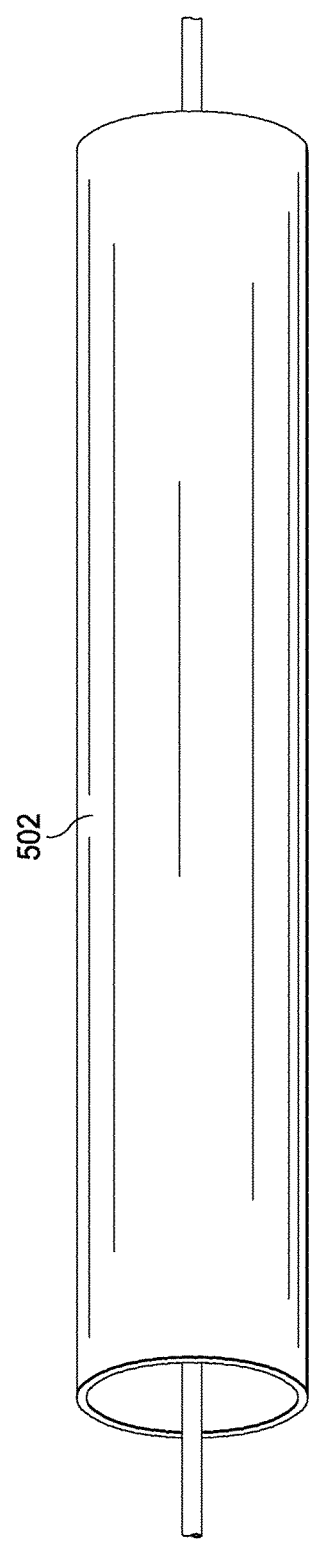

VIBRATION DAMPENING DEVICES AND METHODS

CROSS-REFERENCE TO RELATED APPLICATIONS

This application is related to the following co-pending and commonly-assigned patent application: Ser. No. 13/931,365, filed Jun. 28, 2013, entitled "Magnetically Enhanced Electrical Signal Conduction Cables and Methods," which application is hereby incorporated herein by reference.

TECHNICAL FIELD

The present invention relates generally to electrical signal conduction, and more particularly to a vibration dampening devices and methods.

BACKGROUND

Generally, there currently exists a large variety of cables and connectors for signal conduction. The signals transmitted via cables and connectors generally may be data signals or power signals. For example, in an audio-video system, power cables and connectors provide power from a power source (e.g., 110/120 volts alternating current (VAC), 220/240 VAC) to the various components of the system. Data cables transfer data signals between components of the system, such as from analog or digital content-source components (e.g., optical disk players, satellite, cable or fiber boxes, media servers, digital video recorders, computers, cassette tape players) to an amplifier (e.g., pre-amplifier/power amplifier, integrated amplifier, receiver). The amplifier processes the input data signals (e.g., source switching, surround sound decoding, and amplification). Other data cables transfer outputs from the amplifier to devices that directly interact with a user (e.g., loudspeakers, headphones, televisions, monitors). In some systems, various combinations of these components may be integrated into a single unit. For example, a television may contain amplifier components so that a source device may connect directly to the television.

Essentially since the beginning of signal transmission, there has been a continuous effort in the art to improve the quality of data and power signals transmitted between devices, such as through cables and their connectors, as well as between components within devices.

SUMMARY OF THE INVENTION

An embodiment vibration dampening device includes a stack of permanent magnets having a plurality of cross-sectional areas, wherein the permanent magnets are electrically coupled in series with each other. The device further includes an insulating sheath disposed around the stack of permanent magnets, and a dampening fluid disposed within the sheath and around the stack of permanent magnets.

An embodiment method of forming a vibration dampening device includes forming a stack of permanent magnets having a plurality of cross-sectional areas, wherein the permanent magnets are electrically coupled in series with each other. The method further includes disposing an insulating sheath around the stack of permanent magnets, and inserting a dampening fluid within the sheath and around the stack of permanent magnets The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a perspective view of an embodiment vibration dampening device;

FIG. 5 is a diagram of a vibration dampening device with a Faraday cage;

DETAILED DESCRIPTION OF ILLUSTRATIVE EMBODIMENTS

Figure 1:
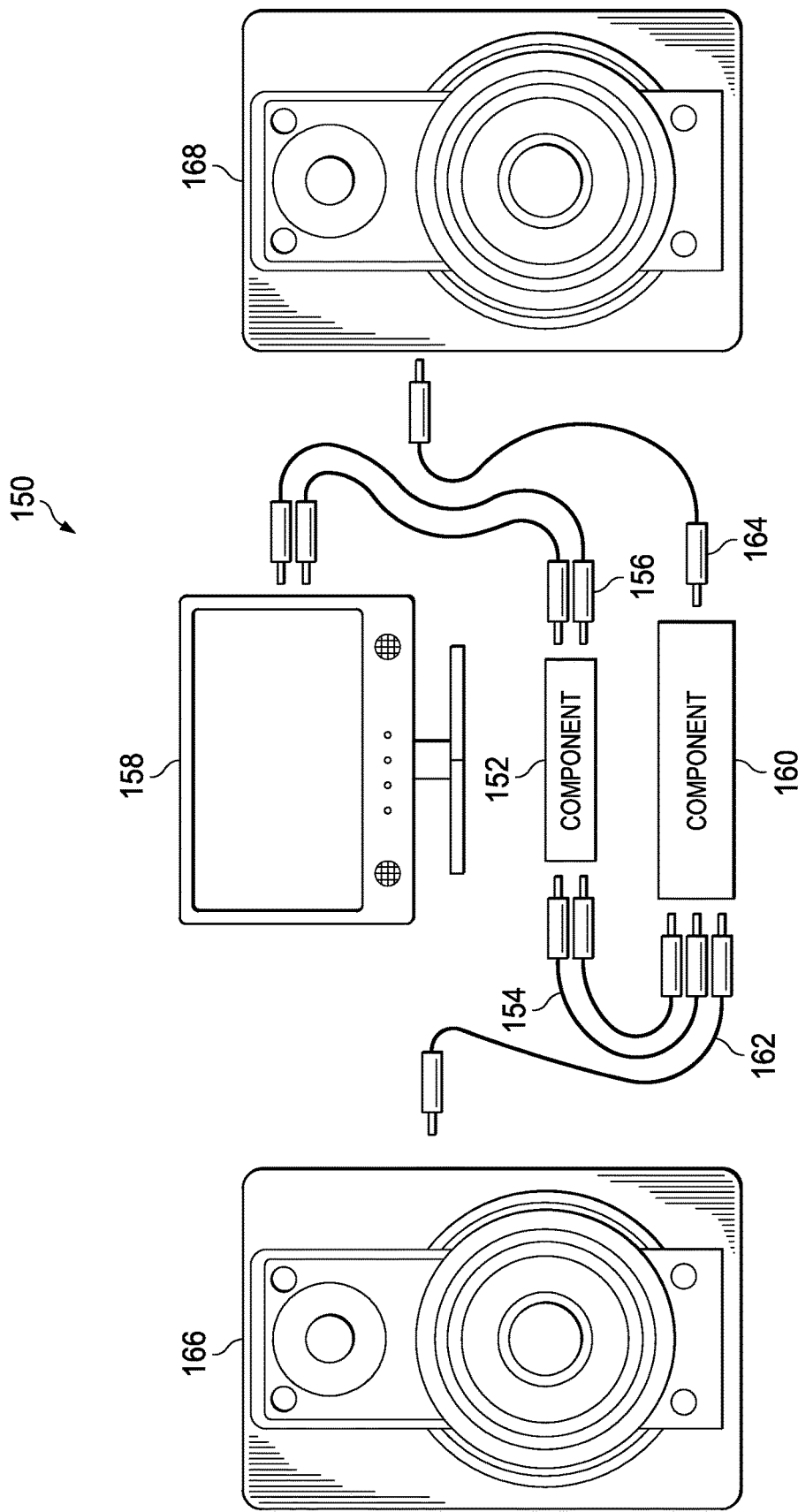
FIG. 1 is a block diagram of an audio-video system.

The making and using of the presently preferred embodiments are discussed in detail below. It should be appreciated, however, that the present invention provides many applicable inve4180ntive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, primarily the utilization of noise and vibration dampening to improve signal quality transmission in audio-video systems. The invention may also be applied, however, to other systems, such as computer systems, power transmission systems, automobile and other vehicular electrical systems, and the like.

Electrical and electronic components and systems are sensitive to vibrations and noise, which can interfere with signal quality and cause interference with other components. There are two primary noise paths that degrade audio and video signal quality. First, structure-born energy travels through a structure to cause noise and vibration. Second, air-born energy travels through the air directly to a component to cause noise and vibration. Many components and systems are subject to vibration from internal and external sources.

Vibration dampening material has been used to reduce or eliminate noise in electronic applications caused by resonance and vibration. For example, vibration dampening material may be used in the feet of electronic equipment and in lining the walls of a speaker enclosure. Vibration dampening materials generally convert mechanical energy into thermal energy, and generally change the natural vibration frequency of the vibrating surface to lower radiated noise and increase the physical vibration transmission loss of surface or volume.

An embodiment device includes a series of varying-diameter and electrically-conductive magnets/ferromagnetic materials surrounded by a material with a relatively-high dampening coefficient. An embodiment material provides vibration isolation, vibration dampening and/or vibration absorption. An embodiment method includes the manufacture of such devices. Another embodiment method includes the use of such devices.

While various embodiments primarily are described herein with respect to active signal conduction to/from or between devices, the present invention also may be implemented in any other type of wired electrical signal conduction application. That is, embodiments may be implemented anywhere an electrical signal is transferred over a wired connection, such as any of the embodiments disclosed in U.S. Pat. No. 8,272,876 and U.S. patent application Ser. No. 13/931,365. For example, embodiments may be implemented as all or part of an electrical signal connection between the components in an audio-video device (e.g., power supply, PCBs, power amplifiers, speakers, mounted connectors, etc.), between the components in a power transfer device such as a transformer, and the like.

FIG. 1 illustrates an audio-video system 150 and examples of cables connecting the various components. Embodiment vibration dampening devices may be used in-line with any of the power, active signal and ground conduction paths within or between the different components in such an audio-video system. As described below, and as described in detail in U.S. Pat. No. 8,272,876, issued Sep. 25, 2012, and entitled "Magnetically Enhanced Electrical Signal Conduction Apparatus and Methods," and U.S. patent application Ser. No. 13/931,365, filed Jun. 28, 2013, entitled "Magnetically Enhanced Electrical Signal Conduction Cables and Methods," both of which are hereby incorporated herein by reference, the particular types of cables and connectors used in and between different components may be selected from a wide variety of cables and connectors.

In the system shown in FIG. 1, a media source device, such as digital video disc (DVD) player 152, generates both audio and video signals, which are output through cables 154 and 156, respectively. Cables 156 provide the video signal to television 158. As an example, a single RCA cable may provide a composite video signal to television 158. As another example, three RCA cables may provide component video signals to television 158. Audio signals are provided to amplifier 160 via cables 154. As an example, two RCA cables may provide left and right audio signals to amplifier 160. Amplifier 160 provides speaker level outputs via cables 162 and 164 to speakers 166 and 168, respectively. As an example, these cables may comprise connectors that allow connection to five-way binding posts, which allow the connection of banana plugs, pin connectors, bare wire, or ring or spade lug terminals. For loud speaker connections, the active signal and ground generally are connected with separate connectors.

Figure 2:
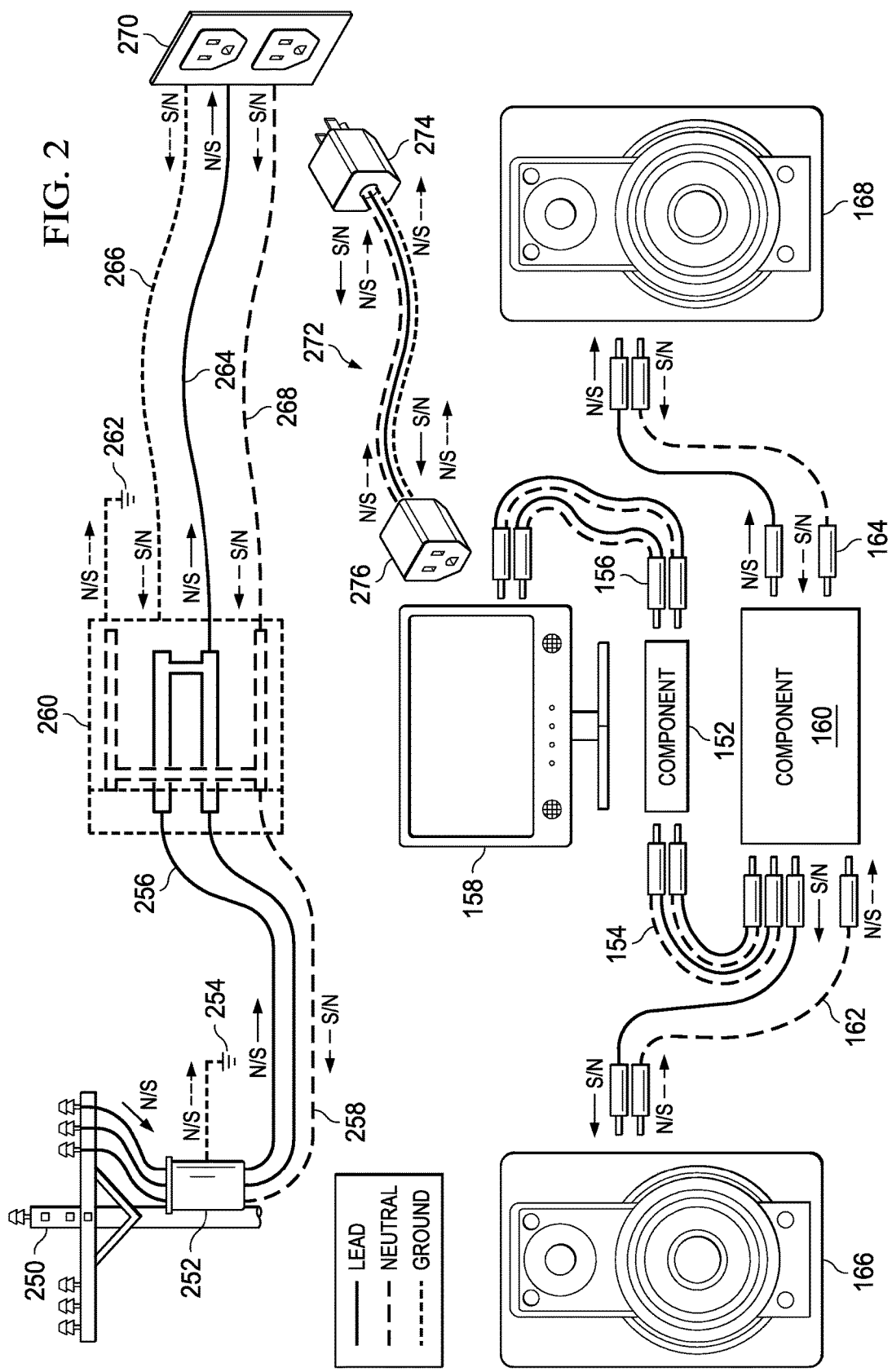
FIG. 2 is a block diagram of an electrical system.

FIG. 2 illustrates an electrical system showing the coordinated orientation of permanent magnets in embodiment vibration dampening devices placed throughout the system. In this example, the permanent magnets are oriented such that the north pole of the magnets generally faces the source of that signal, and the south pole faces downstream from the signal source. Alternatively, the permanent magnets may be oriented such that the south pole of the magnets generally faces the source of that signal, and the north pole faces downstream from the signal source.

In general, high-voltage multi (e.g., single, two or three) phase power is supplied from the power grid via transmission lines 250. As explained in more detail below, vibration dampening devices may be disposed in-line at various points of the power grid, for example in cables at transmission line towers, telephone poles, underground junction boxes, and the like. The permanent magnets may have the same orientation on the multiple phases, as shown by the N/S arrow next to the three high voltage lines 250.

The high voltage lines feed into a step-down transformer 252, which is connected to ground 254 and drops the high voltage down to standard 120V/240V power on power signal lines 256 and neutral line 258. Vibration dampening devices may be disposed in cables connected to step-down transformer 252. The vibration dampening devices follow the orientation of the signal flow in a given cable or interface, with active signals flowing in one direction and the associated ground or neutral signals flowing in the opposite direction. For example, vibration dampening devices in active signal (hot) leads 256 have north/south orientations, and in the neutral line 258 have a south/north orientation, as shown in FIG. 27. These lines feed into breaker box 260, which is disposed, for example, at a residential or commercial location. Breaker box 260 also may be connected to ground 262 and may have vibration dampening devices installed in cables in the input and output signal paths, again with the active signal leads 256 and 264 and ground 262 permanent magnets having north/south orientations, and the neutral lines 258 and 268 and ground 266 permanent magnets having south/north orientations.

Power lines comprising active power signal 264, neutral line 268 and ground line 266, one or more of which include vibration dampening devices with permanent magnets, run from the breaker box 260 to wall outlet 270. Wall outlet also may have vibration dampening devices disposed in the signal paths with orientations shown in FIG. 2. A power cable 272 having vibration dampening devices may be plugged into wall outlet 270. An audio-video system comprises components 152, 158, 160, 166 and 168, as shown in FIG. 1, and receives power from power cable 272. The components that receive power may have vibration dampening devices disposed in their internal power cables corresponding to those in power cable 272, similar to that of internal wall cables for wall outlet 270.

Vibration dampening devices having permanent magnets utilized with the data signals transferred between the components of the audio-video system also follow the magnetic orientation of the power signals. Speaker cables 162 and 164 have vibration dampening devices such that each active signal being transmitted to each speaker has a north/south orientation, and the neutral signals being sent back have south/north orientations, with respect to amplifier 160. In data cables transmitting signals between source component 152 and monitor 158, and between source component 152 and amplifier 160, permanent magnets again follow the orientation convention of the rest of the system. That is, in cables 154 and 156, the magnetic north pole of the magnets in the active signal path faces the source component output, while the magnetic north pole of the magnets in the neutral/ground signal path faces the destination component input (monitor 158 and amplifier 160).

Figure 3:
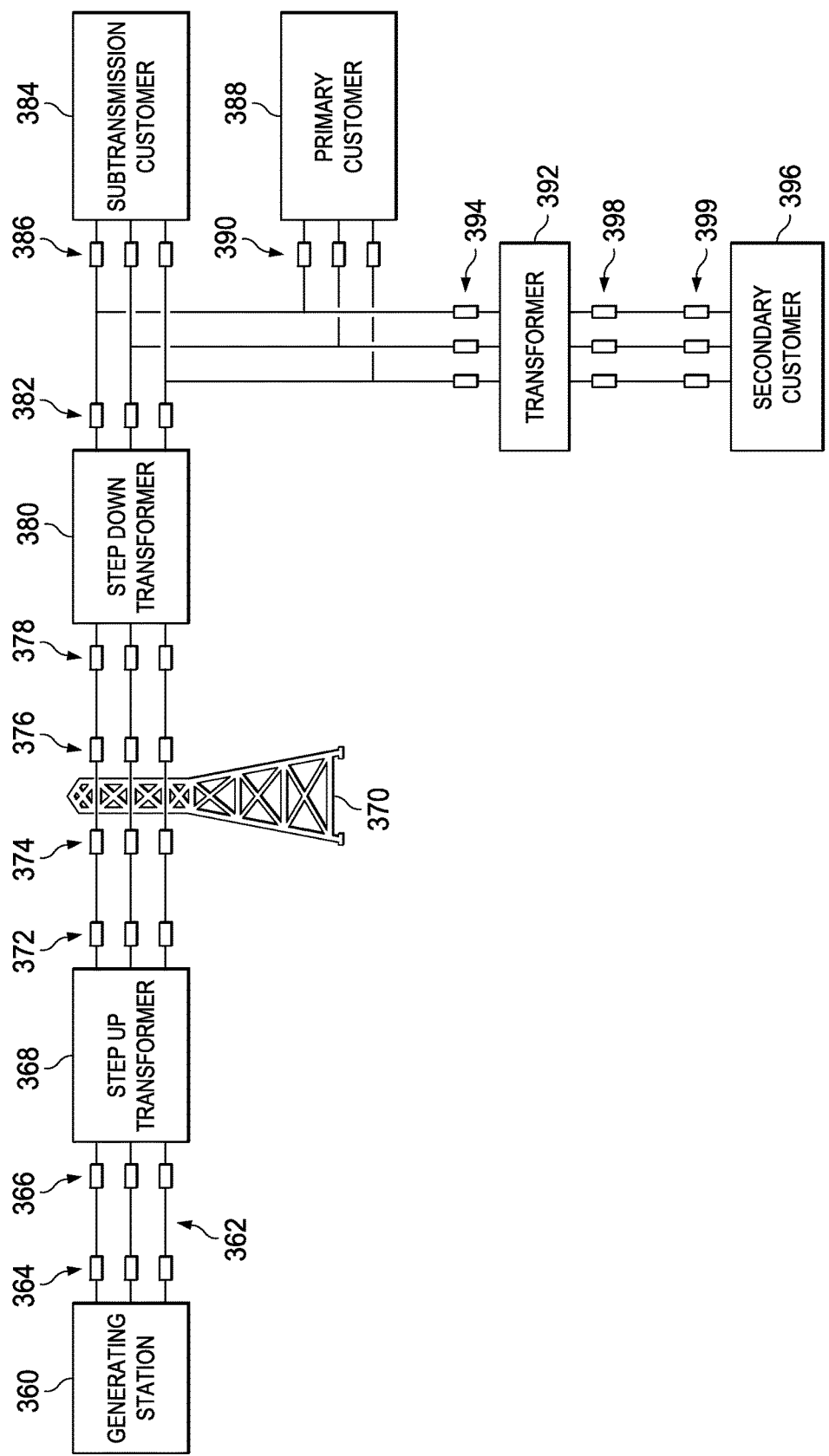
FIG. 3 is a block diagram of an electrical power grid.

FIG. 3 illustrates a high level view of an electrical power grid incorporating vibration dampening devices having permanent magnets at various locations in the system. Generating station 360 may be a coal power plant, a nuclear power plant, a hydroelectric power plant, and the like. Generating station 360 produces electrical power for the power grid from energy sources such as coal, nuclear, and dammed water.

The electrical power is sent to a step-up transformer 368 via power lines 362. Power lines 362 may comprise ferromagnetic conductors and have vibration dampening devices 364, 366 disposed in line with the ferromagnetic conductors. Alternatively, the conductors may be non-ferromagnetic. Vibration dampening devices 364 may be disposed at the output of the generating station, and vibration dampening devices 366 may be disposed at the input of the step-up transformer 368. Alternatively, vibration dampening devices may be disposed elsewhere in-line with the conductors.

Step-up transformer 368 steps up the voltage on power lines 362 to three-phase high voltage for long distance transmission via high power transmission lines and transmission towers 370. The high voltage, which may be 110 kV and higher (e.g., 138 kV, 230 kV, 345 kV, 500 kV, and 765 kV), transmits over long distances with less energy loss than lower voltage power. The transmission lines and transmission towers 370 transmit power to local areas that will use the power, at which point the high voltage is stepped down to a lower voltage by step-down transformer 380. The conductors carrying the energy between the transformers may comprise a ferromagnetic material such as steel or nickel. The step-up transformer 368 may have vibration dampening devices 372 disposed in-line at its outputs to the high voltage transmission lines, and the step-down transformer 380 may have vibration dampening devices 378 disposed in-line at its inputs from the high voltage transmission lines. Likewise, vibration dampening devices may be disposed periodically throughout the transmission lines, such as vibration dampening devices 374 and 376 disposed in-line with the conductors at transmission towers 370.

Step-down transformer 380 steps down the three-phase high voltage to a three-phase low voltage, such as 4 kV, 13 kV, 26 kV, 50 kV or 69 kV for transmission over shorter distances. The conductors between step-down transformer 380 and subsequent entities or customers may comprise ferromagnetic material such as steel or nickel. Alternatively, the conductors may be non-ferromagnetic. Industrial, government and other subtransmission customers 384 and primary customers 388 may receive power directly from the stepped-down output of the step-down transformer 380. These entities also may provide power back to the power grid based on power demand and excess capacity.

The step-down transformer 380 may have vibration dampening devices 382 disposed in-line at its outputs to the low voltage lines, and subtransmission customers 384 and primary customers 388 may have vibration dampening devices 386 and 390 disposed in-line at their inputs from the low voltage lines. As with the high voltage lines, vibration dampening devices may be disposed periodically throughout the low voltage transmission lines, such as in-line with the conductors at low voltage utility poles or towers.

Another transformer 392 converts the low voltage from the step-down transformer 380 to single-phase household voltages such as 110V/220V (or 117V/134V, or 120V/240V) for use by industrial, commercial, and residential secondary customers 396. Again, the conductors in the single phase power lines may comprise ferromagnetic materials such as steel nickel, and the like. Transformer 392 may have vibration dampening devices 398 disposed in-line at its outputs to the single phase power lines, and secondary customers 388 may have vibration dampening devices 399 disposed in-line at their inputs from the household voltage lines.

FIG. 4 illustrates an embodiment vibration dampening device 400. Vibration dampening device 400 includes a stacked series of permanent magnets 402, 404 having varying outer diameters or cross-sectional areas along the stack. For example, permanent magnets 402 have a smaller diameter or cross sectional area than permanent magnets 404. In this specific example embodiment, starting at one end of the device, the stack includes four larger diameter permanent magnets 404, followed by three series of alternating smaller diameter permanent magnets 402 and larger diameter permanent magnets 404. In the middle of the device there are two extra smaller diameter permanent magnets 402, and then the opposite sequence repeats to the other end of the stack. This is merely one example of a stack sequence, and there are numerous other combinations of magnet shapes, sizes, materials and quantities that can be stacked to provide a series of varying-diameter or varying-cross sectional area permanent magnets. The terms larger and smaller, with respect to diameters and cross-sectional areas, are used herein as being relative to each other. Thus permanent magnets 402 have a smaller diameter than permanent magnets 404, and, likewise, permanent magnets 404 have a larger diameter than permanent magnets 402. The ratio of the cross-sectional areas between the large and small magnets may be, for example, at least 1.5:1, at least 2:1, at least 3:1, or at least 4:1.

The permanent magnets are surrounded by an insulating sheath 406, which may be made from a variety of materials, such as polycarbonate, polytetrafluoroethylene (PTFE), e.g., TEFLON® PTFE by Dupont, plexiglass, plastic, ceramic, or other type of insulating material.

A high viscosity or non-flowing vibration dampening fluid 408 is disposed in the spaces between permanent magnets 402, 404 and sheath 406. In an embodiment, the dampening fluid provides vibration dampening or vibration isolation to reduce or eliminate vibration energy transfer. Sheath 406 has one or more holes in its sides (shown in FIG. 6) to allow fluid 408 to be injected inside the sheath. Sheath 506 also may have one or more vent holes to allow the ambient gas, e.g., air, to evacuate the space while fluid 408 is being ejected.

The varying cross-sectional areas of the permanent magnets provide a large exposed surface area for contacting dampening fluid 408. For example, a thin, large diameter disk 404 alternating with a small sphere or cylinder 402 allows a large amount of dampening fluid 408 to be disposed in the exposed spaces outside of magnet 402 and between two magnets 404 adjacent either side of magnet 402.

The dampening fluid 408 may be conductive or nonconductive. The material for dampening fluid 408 may be a dampening gel such as a visco-elastic material exhibiting properties of both viscous liquid solutions and elastic solid materials. Examples of materials for dampening fluid 408 include visco-elastic polymer, siloxane gel, silicone gel (e.g., ECOFLEX® silicone by Smooth-On, Inc.), polyurethane (e.g., SORBOTHANE® polyurethane by Sorbothane, Inc.), electrically conductive gel (e.g., Spectra 360 electrode gel by Parker Labs), etc. The dampening fluid may be gel-based, water-based, oil-based, emulsive-based, etc. It may contain a non-fluid colloidal or polymer network that is expanded throughout its volume by a fluid. Further examples include antifreeze, grease, motor oil, transmission fluid, etc.

An insulated or uninsulated conductive cable or conductor 410 of solid or stranded wire is attached to each end of vibration dampening device 400 for connection to devices and in systems such as those shown in FIGS. 1-3. The cables 410 may be attached in a variety of ways, such as magnetically, by solder, etc. The cables 410 may include connectors or be hard-wired into a system. The cables may be made from a non-permanent-magnetic material such as copper, gold, aluminum, or a combination thereof. As another alternative, the cables may be made from a non-permanent-magnet ferromagnetic material, such as steel, nickel or mu-metal.

As shown in FIG. 5, an electrically conductive sleeve or Faraday cage 502 may be disposed around sheath 406 to block electric fields and some electromagnetic radiation. The Faraday cage may be a conducting or ferromagnetic material. The Faraday cage may be solid or a mesh. The holes in the mesh generally should be significantly smaller than the frequency of the electromagnetic radiation generated by the signal traveling through the magnet(s). A single conductive layer may be used, or multiple (e.g., two, three, four) concentric layers may be used. The Faraday cage may be steel, mu-metal, etc., and may be used in any of the embodiments disclosed herein. As an alternative, other conductive materials, such as copper, aluminum, etc. may be used. As another alternative, an insulating material made of, e.g., plastic, acrylic, plexiglass, a flexible laminate or other dielectric material may be disposed on the outside of the Faraday cage.

Figure 6:
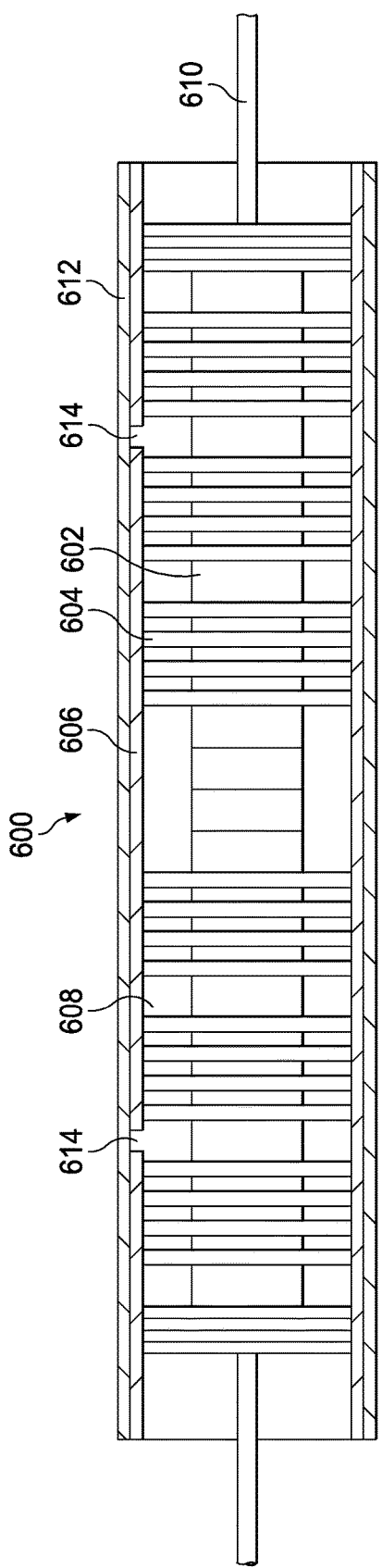
FIG. 6 is a cross-sectional view of an embodiment vibration dampening device.

FIG. 6 illustrates a cross-sectional view of vibration dampening device 600. Similar to the embodiments in FIGS. 4 and 5, device 600 includes a stack of smaller diameter permanent magnets 602 and larger diameter permanent magnets 604, insulating sheath 606, vibration dampening fluid 608, conductors 610, and Faraday cage 612. Device 600 also includes insertion/venting holes 614 in sheath 606, for use in injecting fluid 608 into the spaces not occupied by magnets 602, 604 inside sheath 606.

Figure 7:
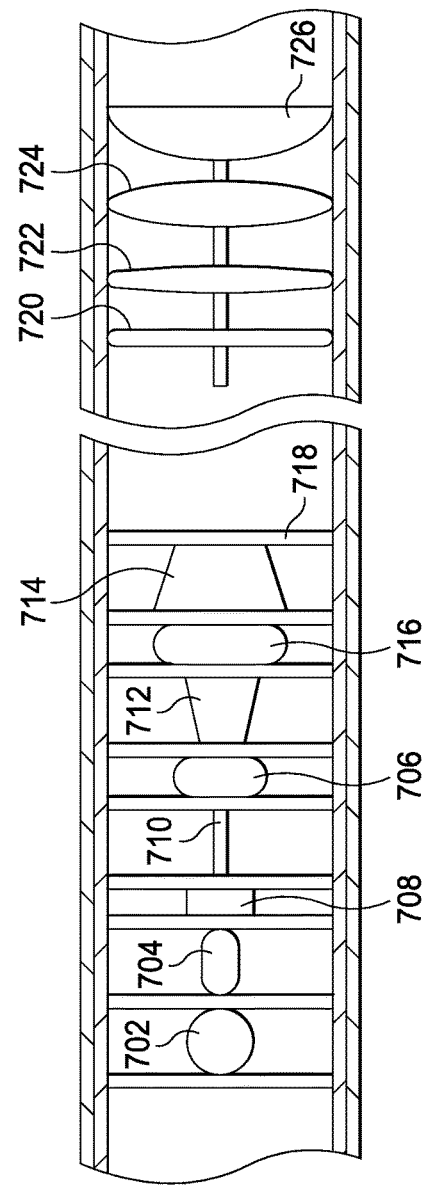
FIG. 7 is a cross-sectional view of various embodiment components of a vibration dampening device.

As illustrated in the cross-sectional view in FIG. 7, the permanent magnets in a vibration dampening device may have a variety of geometries, either between implementations or within the same implementation. The smaller diameter permanent magnets may be shaped as spheres 702, oblate or prolate spheroids 704, 706, hemi-spheroids, partial spheroids, stretched spheroids, etc. Further, as used herein, the term spheroid is intended to include those shapes that have a partial spheroid shape at the electrical connection junction with another magnet or other electrically conductive component. For example, a spheroid may have a partial spheroid shape at either end, joined together, e.g., with a polyhedron, cylinder, cuboid, or other shape in the center. The smaller diameter permanent magnets may have other geometries, such as cylinders 708, 710, cones 712, prisms 714 (rectangular, cube, triangular, hexagonal, etc.), pyramids (triangular, square), toruses 716, or be irregularly shaped. As further examples, a pyramid shape may have a base that is a trilateral, quadrilateral, or any polygon shape. As another example, a cylinder may have a height that is smaller, equal to, or longer than its diameter.

As with the smaller diameter permanent magnets, the larger diameter permanent magnets may have a variety of geometries, between implementations or within the same implementation, such as any of those described above. For example, the larger diameter permanent magnet may be shaped as a circular disk or cylinder 718, a disk with rounded edges 720, a oblate or prolate spheroids 722, 724, a hemi-spheroid 726, etc.

Figure 8:
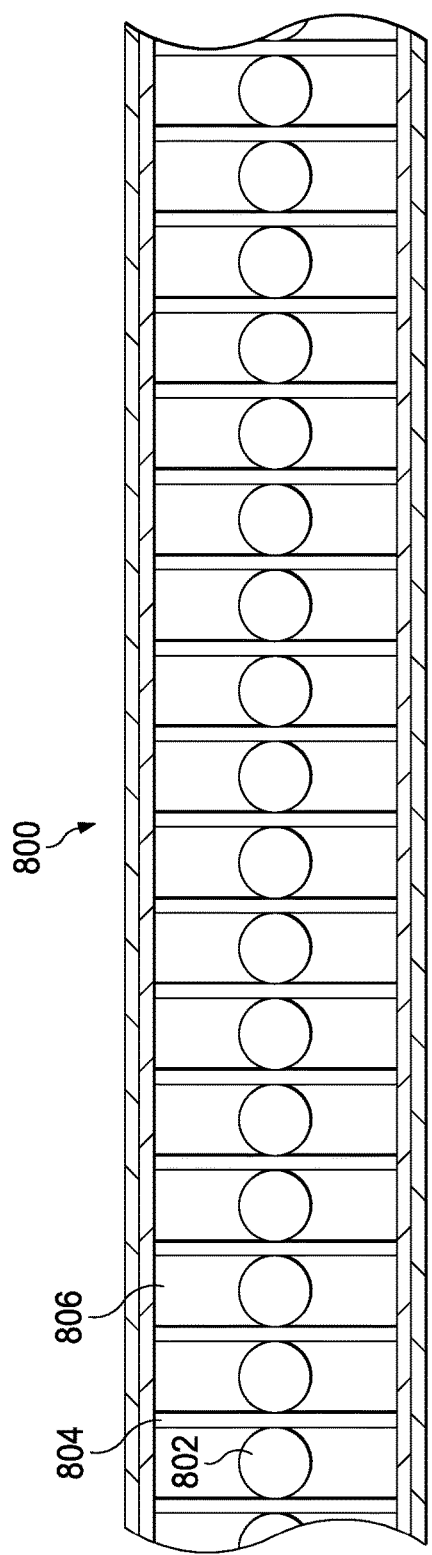
FIG. 8 is a cross-sectional view of another embodiment dampening device.

FIG. 8 illustrates a cross-sectional view of vibration dampening device 800 as one example of the types of devices exemplified in FIG. 7. That is, vibration dampening device 800 includes permanent magnet spheres 802 alternating with permanent magnet disks 804. The regions between the spheres 802 and the disks 804 are filled with vibration dampening fluid 806. This embodiment can contain a significant amount of dampening fluid 806 depending on the relative sizes of the spheres and the disks.

Figure 9:
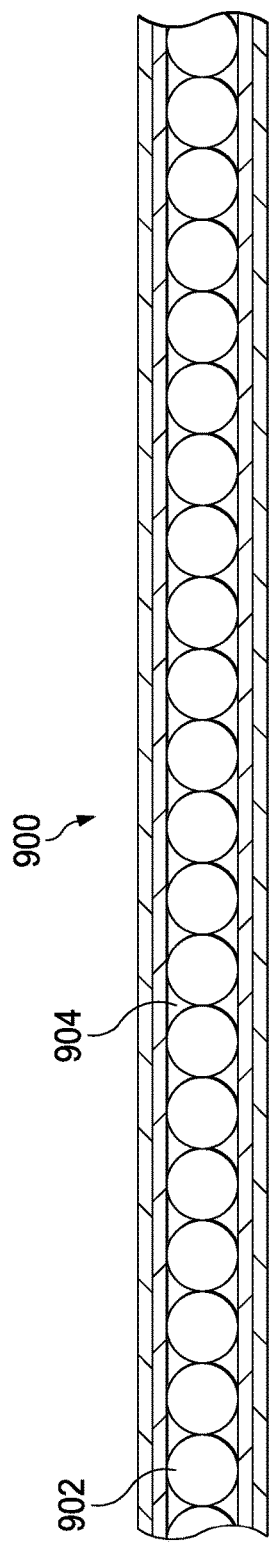
FIG. 9 is a cross-sectional view of another embodiment dampening device.

FIG. 9 illustrates a cross-sectional view of vibration dampening device 900 as another example of the types of devices shown in FIG. 7. In this case, vibration dampening device 900 includes permanent magnet spheres 902 without disks. The regions between the spheres 902 are filled with vibration dampening fluid 904. This embodiment may contain less dampening fluid 906 than the embodiment shown in FIG. 8, but because the spheres 902 only connect to each other at a tangent to their outer surfaces, there is sufficient space for dampening fluid 904 to perform its dampening function. Any of the other components shown in FIG. 7 may be implemented in a similar manner as that shown in FIGS. 8 and 9.

The permanent magnets may be a variety of sizes, with smaller diameter ones alternating with larger diameter ones periodically in a patterned or non-patterned manner. The smaller diameter permanent magnets may have varying diameters between themselves. Likewise, the larger diameter permanent magnets may have varying diameters between themselves. The permanent magnets may be solid or hollow. Any of the geometric shapes may be truncated or rounded on one or more ends. The different shapes can be smooth sided, or have multiple sides with a varying number of sides.

In any given embodiment there may be any number of permanent magnets in a vibration dampening device, such as five or more magnets, ten or more magnets, fifty or more magnets, one hundred or more magnets, etc.

The permanent magnets are oriented so that their magnetic poles are aligned with each other, with the north poles oriented toward one end of the device and the south poles oriented toward the other end of the device. Increasing the quantity of north-south pole changes in the stack or chain (i.e., the number of magnets in the stack or chain) generally improves the general flow of electricity and power/data transfer over embodiments with a fewer number of magnets. The number of permanent magnets may be increased by adding more magnets to the stack or chain, and the overall size of the stack may be kept to a reasonable size by utilizing thinner magnets. Further discussion of magnetic field orientations is provided in U.S. Pat. No. 8,272,876, issued Sep. 25, 2012 to R. Schultz, and entitled "Magnetically Enhanced Electrical Signal Conduction Apparatus and Methods.

Achieving a strong magnetic field generally is desirable, and the magnetic material generally should have a high magnetic permeability. A stronger magnetic field may be generated by, for example, using a magnet with a larger volume, a larger cross-sectional area, a longer length, or a higher Maximum Energy Product, $BH_{max}$. $BH_{max}$ measures magnetic field strength at the point of maximum energy product of a magnetic material, and is measured in Mega-Gauss-Oersteds (MGOe).

A wide array of materials with varying magnetic strength may be used as the permanent magnets in the disclosed embodiments. As examples, $Nd_2Fe_{14}B$ magnets generally have a $BH_{max}$ in the range of about 8 to 53 MGOe, $Sm_1Co_5$ or $Sm_2Co_{17}$ magnets generally have a $BH_{max}$ in the range of about 14 to 32 MGOe, Alnico magnets generally have a $BH_{max}$ in the range of about 1 to 10 MGOe, and ferrite magnets such as $SrO$-$6(Fe_2O_3)$ (strontium hexaferrite) or $BaO$-$6(Fe_2O_3)$ (barium hexaferrite) generally have a $BH_{max}$ in the range of about 1 to 5 MGOe.

Generally, the higher the material grade, the stronger the magnet field of the material. Preferably, a material or combination of materials used has both high magnetic field strength and high electrical conductivity. These parameters may be traded off for each other as well. For example, a lower conductivity material may be acceptable if it has a higher magnetic field strength. Likewise, a lower magnetic field strength material may be acceptable if it has a higher electrical conductivity.

Rare earth permanent magnets generally have relatively strong magnetic fields compared to non-rare earth permanent magnets. Rare earth elements are a family of elements with atomic numbers from 57 to 71, plus 21 and 39, and specifically are lanthanum, cerium, praseodymium, neodymium, samarium, europium, gadolinium, terbium, dysprosium, holmium, erbium, thulium, ytterbium, lutetium, scandium, and yttrium. Rare earth magnets include rare earth elements and their alloys, such as neodymium and neodymium-based alloys, samarium and samarium-based alloys, praseodymium and praseodymium-based alloys, gadolinium and gadolinium-based alloys, dysprosium and dysprosium-based alloys. Commonly used rare earth magnets include neodymium (NdFeB, or NIB) magnets and samarium cobalt (SmCo) magnets.

Sintered neodymium magnets with grades from N3x to N4x to N5x are preferable for applications benefiting from high magnetic field strength. These include N35, N40, N42, N48, N50 and N52 grades, for example. The specific magnet used for a particular application may depend on tradeoffs between parameters such as magnetic field strength, cost, and availability.

Another type of neodymium magnet that may be used is a bonded neodymium magnet. While bonded materials generally are not as powerful as sintered materials, bonded neodymium magnets are quite strong and would still work well. Sintered and bonded samarium cobalt magnets generally have a high Curie temperature, resist corrosion well and may be used with or without surface coatings, but generally are less powerful than neodymium magnets.

Non-rare earth magnets include iron and iron-based alloys (such as steel, iron alloyed with carbon that also may comprise other elements such as manganese, chromium, vanadium, molybdenum, nickel and tungsten), nickel and nickel-based alloys, permalloy (nickel iron alloy that also may comprise molybdenum), and cobalt and cobalt-based alloys.

Alnico (AlNiCo) magnets generally are less powerful than rare-earth magnets, but typically are easily machined and can be made into many different shapes, allowing for use with a wide range of connector shapes and sizes Alnico alloys typically comprise 8-12% Al, 15-26% Ni, 5-24% Co, up to 6% Cu, up to 1% Ti, with the balance being Fe.

Mu-metal is a nickel-iron alloy (approximately 75% nickel, 15% iron, plus copper and molybdenum) that has very high magnetic permeability. Mu-metal may be useful in some applications because of its high magnetic permeability and conductivity.

Ferrite magnets such as strontium ferrite and barium ferrite magnets generally have the lowest magnetic field strength, and may be usable but are less preferred than the other, stronger permanent magnet materials.

Some permanent magnets may comprise materials that are more brittle, less conductive, or more corrosion resistant than desired for a given application. Therefore, magnets may be plated or coated to increase physical strength, corrosion resistance, conductivity, or any combination thereof. Conductive metals, such as copper, nickel, gold, silver, or any combination thereof, may be used to coat permanent magnets. Nickel benefits by being ferromagnetic. Copper and silver both are highly conductive. Gold is both quite conductive and has high corrosion resistance.

Magnets may be plated in layers such as combinations of the above, or nickel-nickel, copper-nickel or nickel-copper-nickel. Black nickel, zinc, aluminum and other conductive metals and metal alloys may be possible as well. As an example, because nickel is less conductive than some other metals, plating alternatively or additionally with highly conductive metals such as gold, copper, silver, and the like, may increase conductivity.

Some of the individual components in the stack can be ferromagnetic materials in addition to or instead of permanent magnets. In other embodiments, one or more of the components may alternatively be made from other conductive materials, such as gold, copper, aluminum, or a combination thereof, or from a non-permanent-magnet ferromagnetic material, such as steel or nickel or mu-metal.

One embodiment coating selected from the various materials comprises nickel for mechanical strength, copper for conductivity and smooth quality plating, and gold plating on the outside to protect against corrosion and further aid in conductivity. These coatings may be used with sintered neodymium magnet cores of N30 grade or higher, or more preferably N40 grade or higher, or more preferably N50 grade or higher, for various applications.

The ferromagnetic components preferably are a hard ferroelectric material, but also may be a soft ferroelectric material. A ferromagnetic material with high magnetic permeability or a ferromagnetic material with high conductivity, or both, may offer a stronger effect. Various ferromagnetic materials have different values for resistivity. By way of example for relative comparison, cobalt may have a resistivity in the range of about 62.4 nano-ohms per meter, nickel may have a resistivity in the range of about 69.3 nano-ohms per meter, iron may have a resistivity in the range of about 96.1 nano-ohms per meter, steel may have a resistivity in the range of about 150 nano-ohms per meter, and stainless steel may have a resistivity in the range of about 700 nano-ohms per meter.

Steel provides sufficient conductivity, although there are materials that are more magnetically permeable and more conductive. Nickel, for example, may be utilized to increase conductivity and magnetic permeability. Steel may be coated with copper and silver to increase conductivity and corrosion resistance. Silver is a good outer coating because silver oxide generally remains almost as conductive as silver. The permanent magnets at least partially or completely magnetize the steel, thereby enhancing the effect observed when using a permanent magnet in conjunction with a non-ferromagnetic material in an electrical signal path.

In another embodiment, an entire device may be partially or fully potted with a dampening fluid such as a gel to damp vibration. For example, a transformer may be formed with various ones of the metal (e.g., steel) plates in the core having varying cross-sectional areas, so that the dampening fluid is disposed between larger cross-sectional area plates on the outside of the smaller cross-sectional area plates. Different plates in the core may have relative cross-sections similar to the permanent magnets 602, 604 shown in FIG. 6, but formed as open-center rectangles, and with primary and secondary windings wound around different sections of the core.

Figure 10:
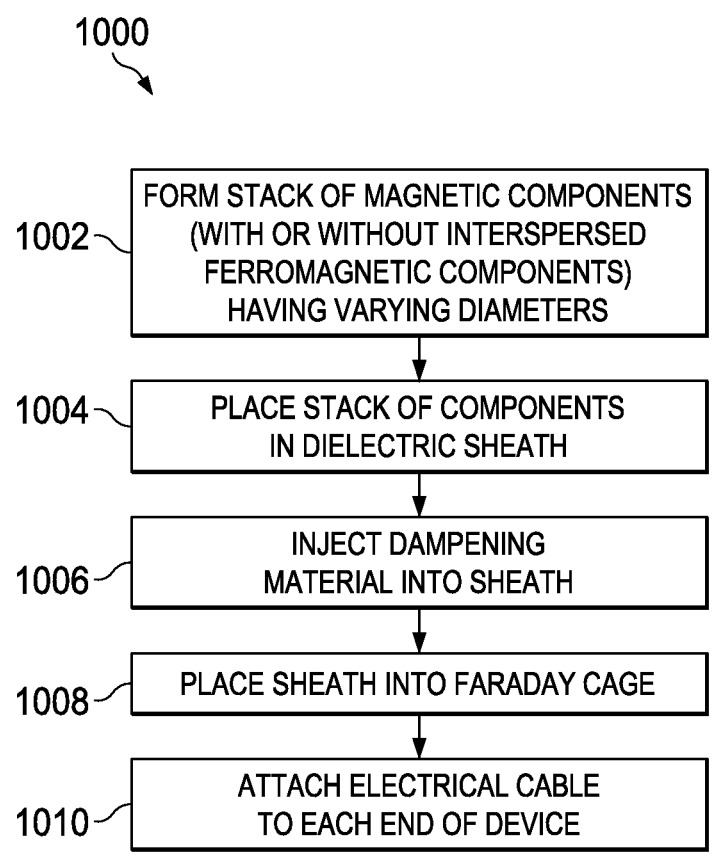
FIG. 10 is a flow diagram of a method of manufacturing a vibration dampening device.

FIG. 10 illustrates a flow diagram 1000 of a method of manufacturing a vibration dampening device. In block 1002, a stack of magnetic components having varying diameters or cross sectional areas is formed. The stack may also include ferromagnetic components interspersed in one or more places in the stack. In block 1004, the stack of components is placed in a dielectric sheath. In block 1006, a dampening material is injected into the sheath. In block 1008, the sheath is placed inside a Faraday cage. In block 1010, electrical cables are connected to each end of the vibration dampening device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A vibration dampening device comprising:
   a stack of permanent magnets having a plurality of cross-sectional areas, wherein the permanent magnets are electrically coupled in series with each other, wherein directly adjacent permanent magnets in the stack of permanent magnets are oriented to magnetically attract each other, wherein the stack comprises a plurality of large cross-sectional area permanent magnets and a plurality of small cross-sectional area permanent magnets, and wherein at least one of the small cross-sectional area permanent magnets is disposed between two of the large cross-sectional area permanent magnets;
   a first electrical conductor mechanically coupled to one end of the stack;
   a second electrical conductor mechanically coupled to another end of the stack, wherein the first and second electrical conductors are electrically coupled to each other via the stack;
   an insulating sheath disposed around the stack of permanent magnets; and
   a dampening fluid disposed within the sheath and around the stack of permanent magnets, wherein the dampening fluid is interposed between the two large cross-sectional area permanent magnets in a region outside a circumference of the at least one of the small cross-sectional area permanent magnets.

2. The vibration dampening device of claim 1, wherein each of the permanent magnets comprises a material selected from the group consisting of: nickel, neodymium, samarium, mu-metal, cobalt, and a combination thereof.

3. The vibration dampening device of claim 1, wherein the first and second conductors each comprises a non-permanent-magnet ferromagnetic material.

4. The vibration dampening device of claim 1, further comprising an electrically conductive sleeve disposed around the insulating sheath.

5. The vibration dampening device of claim 1, wherein each of the permanent magnets has a same north-south pole orientation.

6. The vibration dampening device of claim 1, further comprising at least one non-permanent-magnet ferromagnetic component disposed in the stack.

7. The vibration dampening device of claim 1, wherein the dampening fluid comprises a visco-elastic gel.

8. The vibration dampening device of claim 7, wherein the visco-elastic gel comprises a material selected from the group consisting of: silicone gel, polyurethane, and combinations thereof.

9. The vibration dampening device of claim 1, wherein a ratio of the large cross-sectional area to the small cross-sectional area is at least 2:1.

10. The vibration dampening device of claim 1, wherein each of the large cross-sectional area permanent magnets is disk-shaped.

11. The vibration dampening device of claim 10, wherein a height of each of the small cross-sectional area permanent magnets is longer than the height of each of the large cross-sectional area permanent magnets.

12. The vibration dampening device of claim 1, wherein each of the permanent magnets comprises a cylindrical shape.

13. A method of forming a vibration dampening device, the method comprising:
   forming a stack of permanent magnets having a plurality of cross-sectional areas, wherein the permanent magnets are electrically coupled in series with each other, wherein directly adjacent permanent magnets in the stack of permanent magnets are oriented to magnetically attract each other, wherein the stack comprises a plurality of large cross-sectional area permanent magnets and a plurality of small cross-sectional area permanent magnets, and wherein at least one of the small cross-sectional area permanent magnets is disposed between two of the large cross-sectional areal permanent magnets;
   mechanically coupling a first electrical conductor to one end of the stack;
   mechanically coupling a second electrical conductor to another end of the stack, wherein the first and second electrical conductors are electrically coupled to each other via the stack;
   disposing an insulating sheath around the stack of permanent magnets; and
   inserting a dampening fluid within the sheath and around the stack of permanent magnets, wherein the dampening fluid is interposed between the two large cross-sectional area permanent magnets in a region outside a circumference of the at least one of the small cross-sectional area permanent magnets.

14. The method of claim 13, wherein each of the permanent magnets comprises a material selected from the group consisting of: nickel, neodymium, samarium, mu-metal, cobalt, and a combination thereof.

15. The method of claim 13, wherein the first and second conductors each comprises a non-permanent-magnet ferromagnetic material.

16. The method of claim 13, further comprising disposing an electrically conductive sleeve around the insulating sheath.

17. The method of claim 13, wherein each of the permanent magnets has a same north-south pole orientation.

18. The method of claim 13, wherein forming the stack comprises including at least one non-permanent-magnet ferromagnetic component in the stack.

19. The method of claim 13 wherein the dampening fluid comprises a visco-elastic gel.

20. The method of claim 19, wherein the visco-elastic gel comprises a material selected from the group consisting of: silicone gel, polyurethane, and combinations thereof.

21. The method of claim 13, wherein a ratio of the large cross-sectional area to the small cross-sectional area is at least 2:1.

22. The method of claim 13, wherein a height of each of the large cross-sectional area permanent magnets is disk-shaped.

23. The method of claim 13, wherein inserting the dampening fluid comprises injecting the dampening fluid through a first hole in a side of the sheath and allowing ambient gas to escape through a second hole in the side of the sheath.

* * * * *

UNITED STATES PATENT AND TRADEMARK OFFICE
CERTIFICATE OF CORRECTION

PATENT NO. : 9,631,691 B2
APPLICATION NO. : 14/504239
DATED : April 25, 2017
INVENTOR(S) : Schultz It is certified that error appears in the above-identified patent and that said Letters Patent is hereby corrected as shown below:

In the Claims

In Column 12, Line 30, Claim 11, delete "magnets is longer than the height" and insert --magnets is longer than a height--.

In Column 13, Line 20, Claim 22, delete "wherein a height of each" and insert --wherein each--.

Signed and Sealed this
Tenth Day of July, 2018

Andrei Iancu
*Director of the United States Patent and Trademark Office*